(12) United States Patent
Sato

(10) Patent No.: US 7,575,427 B2
(45) Date of Patent: Aug. 18, 2009

(54) MOLD FOR FOAM MOLDING, METHOD OF MANUFACTURING URETHANE FOAM, AND URETHANE FOAM

(75) Inventor: Masatoshi Sato, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 432 days.

(21) Appl. No.: 11/359,383

(22) Filed: Feb. 23, 2006

(65) Prior Publication Data

US 2007/0057409 A1 Mar. 15, 2007

Related U.S. Application Data

(63) Continuation of application No. PCT/JP2004/012484, filed on Aug. 30, 2004.

(30) Foreign Application Priority Data

Sep. 3, 2003 (JP) ................. 2003-311575

(51) Int. Cl.
*B29C 33/10* (2006.01)
*B29C 33/46* (2006.01)
(52) U.S. Cl. ............... 425/444; 425/436 R; 425/812; 425/817 R
(58) Field of Classification Search ............... 425/4 R, 425/437, 817 R, 812, 444, 556; 264/335; 249/141
See application file for complete search history.

(56) References Cited

U.S. PATENT DOCUMENTS 3,666,229 A * 5/1972 Carrel-Billiard ........... 249/66.1
3,970,732 A * 7/1976 Slaats et al. ............... 264/40.5

(Continued)

FOREIGN PATENT DOCUMENTS

JP 53-101069 8/1978

(Continued)

OTHER PUBLICATIONS

Chinese Office Action dated Jan. 4, 2008.

(Continued)

*Primary Examiner*—Yogendra Gupta
*Assistant Examiner*—Emmanuel S Luk
(74) *Attorney, Agent, or Firm*—Sughrue Mion, PLLC

(57) ABSTRACT

In a foam molding method useful in efficiently manufacturing a foam molding with high surface accuracy and a mold suitable therefor, a plurality of gas-blowing devices 24 including the following members are arranged in the bottom of a cavity 23 present in a lower die 22: valve boxes 25, gas channels 26, valve elements 27, gas flow-restricting valves 28, and other members. The gas channels 26 of the gas-blowing devices 24 are supplied with gas from a common air pump. The valve elements 27 move vertically such that openings of the gas channels 26 that arranged in the cavity are opened or closed. When the gas is supplied to the gas channels 26, the valve elements 27 are moved upward by the pressure of the gas so as to push a molding 34. The valves 28 move upward together with the valve elements 27 and then sit on valve seat sections 31 disposed in the gas channels 26 to restrict the gas to flow into the gas channels 26. The valves 28 have vent holes 32; hence, the gas is allowed to flow into the gas channels 26 although the amount of the glowing gas is small.

16 Claims, 7 Drawing Sheets

U.S. PATENT DOCUMENTS

| | | | | |
|---|---|---|---|---|
| 3,978,186 | A | * | 8/1976 | Lovejoy ..................... 264/102 |
| 4,081,225 | A | * | 3/1978 | Yaita ......................... 425/4 R |
| 4,521,367 | A | * | 6/1985 | Underwood ................ 264/318 |
| 4,531,703 | A | * | 7/1985 | Underwood ............... 249/66.1 |
| 4,614,661 | A | * | 9/1986 | White et al. ................ 426/511 |
| 5,356,284 | A | * | 10/1994 | Sheffield .................... 425/556 |
| 5,368,468 | A | * | 11/1994 | Boskovic .................... 425/556 |
| 5,728,333 | A | | 3/1998 | Tabata et al. |
| 5,997,783 | A | * | 12/1999 | Hunter et al. ................. 264/51 |
| 6,440,348 | B1 | * | 8/2002 | Oppelt et al. ............... 264/279 |
| 6,443,421 | B1 | * | 9/2002 | Wolfe ......................... 251/62 |
| 6,949,208 | B1 | * | 9/2005 | Kawauchi et al. ............. 264/50 |

FOREIGN PATENT DOCUMENTS

| | | |
|---|---|---|
| JP | 54-70366 A | 6/1979 |
| JP | 56-49207 A | 5/1981 |
| JP | 62-173911 U | 11/1987 |
| JP | 9-234748 A | 9/1997 |

OTHER PUBLICATIONS

Japanese Office Action dated Nov. 25, 2008.

* cited by examiner

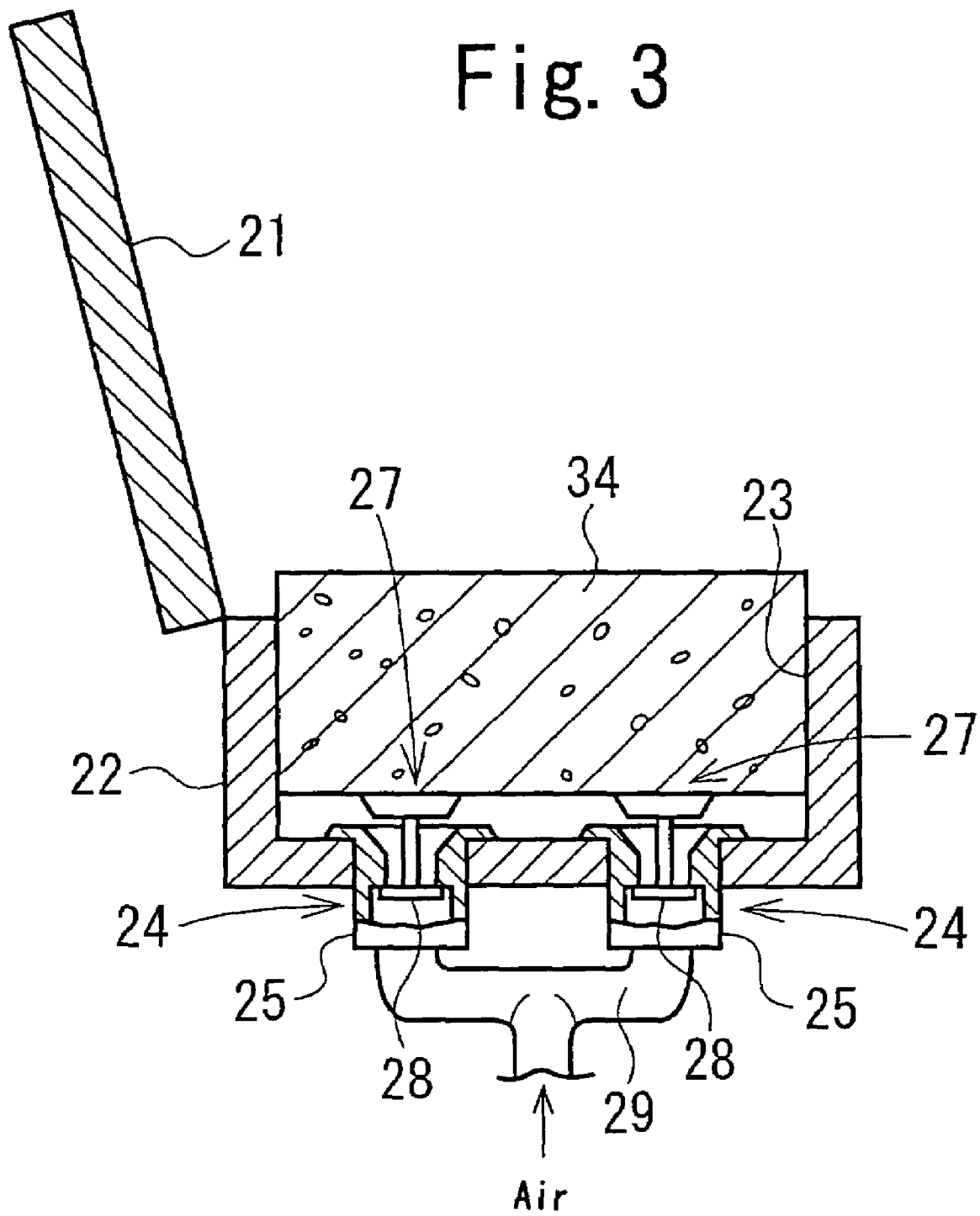

MOLD FOR FOAM MOLDING, METHOD OF MANUFACTURING URETHANE FOAM, AND URETHANE FOAM

CROSS REFERENCE TO RELATED APPLICATION

This is a continuation of International Patent Application No. PCT/JP2004/012484 filed Aug. 30, 2004, which claims the benefit of priority based on Japanese Patent Application No. 2003-311575 filed Sep. 3, 2003. The entire disclosures of the prior applications are considered part of the disclosure of the accompanying continuation application and are hereby incorporated by reference.

FIELD OF THE INVENTION

The present invention relates to molds for manufacturing foam moldings such as urethane foams and particularly relates to a mold from which a molding can be efficiently removed. Furthermore, the present invention relates to a method of manufacturing a urethane foam using the mold and also relates to a urethane foam manufactured with the mold.

BACKGROUND OF THE INVENTION

A hard urethane foam is formed in such a manner that a urethane prepolymer solution is injected into a lower die included in a mold that also includes an upper die, the mold is closed, the urethane prepolymer solution is foamed and then cured, the mold is opened, and the foam is then removed from the mold.

A mold for foam molding includes a lower die and an ejector pin attached to the lower die. When a molding is removed from the blow mold, the molding is pushed up with the ejector pin; hence, the molding is usually bruised with the ejector pin.

As an example of a method of efficiently removing a molding from a die without using any ejector pin, Japanese Unexamined Patent Application Publication No. 9-234748 discloses a foam molding method in which a film is provided on a cavity face of a lower die and a molding is removed from a mold after mold opening in such a manner that air is forced between the film and the cavity face such that the film is separated from the cavity face and the molding is forced out of the lower die by the film.

FIGS. 9A to 9C are sectional views illustrating this method and the mold therefor. This mold includes an upper die 2 and a lower die 3. The upper and lower dies 2 and 3 are detachably coupled to each other. The lower die 3 has a cavity 4.

A polypropylene film 6, formed by a vacuum molding process, having a shape that is similar to or the same as that of the cavity 4 is disposed on the lower die 3. The film 6 is fixed on an upper end face of the lower die 3 with fixing pins 7. Furthermore, the film 6 is clamped between packings 9, disposed on the upper end face of the lower die 3, for film-air sealing and film retainers 8 such that the film 6 is securely fixed to the lower die 3.

An air chamber 10 with a box shape is disposed under the lower die 3. One end of an air tube 12 equipped with a pressure control valve 11 is connected to the air chamber 10 and the other end is connected to an air supply/exhaust device 13. The air chamber 10 communicates with the cavity 4 through a plurality of air perforations (air holes) 14.

The film 6 is vacuum-formed by making use of the lower die 3. That is, the film 6 made of polypropylene is formed so as to have a shape similar to that of the cavity in such a manner that four sides of the film 6 are clamped, the upper and lower faces of the film 6 are heated at 180-200° C. for 15-20 seconds with a heater, the heated film 6 is fixed on the lower die 3 as described above, the cavity 4 and the air chamber 10 disposed under the lower die 3 are evacuated to a predetermined pressure by operating the air supply/exhaust device 13, and the film 6 is thereby pressed against the lower die.

In order to manufacture a hard polyurethane foam molding using the mold 1, a predetermined amount of a source material for hard polyurethane foams is placed on the film 6 disposed in the cavity 4 and the upper die 2 is then fitted to the lower die 3. After the source material is foamed and then expanded as shown in FIG. 9A, the upper die is opened. As shown in FIG. 9B, the air supply/exhaust device 13 is operated; air is introduced into a gap 15 between the film 6 and the cavity 4 through the air tube 12, the air chamber 10, and the air perforations 14; and a molding 16 is pushed up together with the film 6, whereby the molding 16 is removed.

Air is then evacuated with the air supply/exhaust device 13, whereby the film 6 is brought into close contact with the cavity face as shown in FIG. 9C in preparation for the next cycle.

The method disclosed in Japanese Unexamined Patent Application Publication No. 9-234748 requires a step of bringing the film 6 into close contact with the lower die 3 after demolding and the step requires time and manpower. Furthermore, if the film 6 is wrinkled, the film wrinkles are probably transferred to the molding.

SUMMARY OF THE INVENTION

It is an object of the present invention to eliminate the above problems and to provide a mold for foam molding, a method of manufacturing a urethane foam using the mold, and a urethane foam manufactured with the mold. The mold is advantageous in that a foam molding with high surface accuracy can be efficiently formed and removed from the mold.

A mold for foam molding according to the present invention includes a plurality of gas-blowing units for removing a molding from the mold by pneumatically pushing the molding. The gas-blowing units include gas channels extending to the cavity and valve elements which block the gas channels during molding and which are moved into the cavity during demolding in such a manner that the valve elements are pneumatically pushed by gas supplied to the gas channels. The gas channels are supplied with gas from a common gas supply source. The mold further includes gas flow-restricting units which allow the gas to flow into the gas channels after the valve elements block the gas channels and which restrict the gas to flow into the gas channels after the valve elements protrude.

A method of manufacturing a urethane foam according to the present invention uses the mold.

A urethane foam according to the present invention is manufactured by the method.

BRIEF DESCRIPTION OF THE DRAWINGS

FIG. 3 is a sectional view of the mold, shown in FIG. 1, in operation for demolding.

DETAILED DESCRIPTION OF THE PREFERRED EMBODIMENTS

Figure 1:
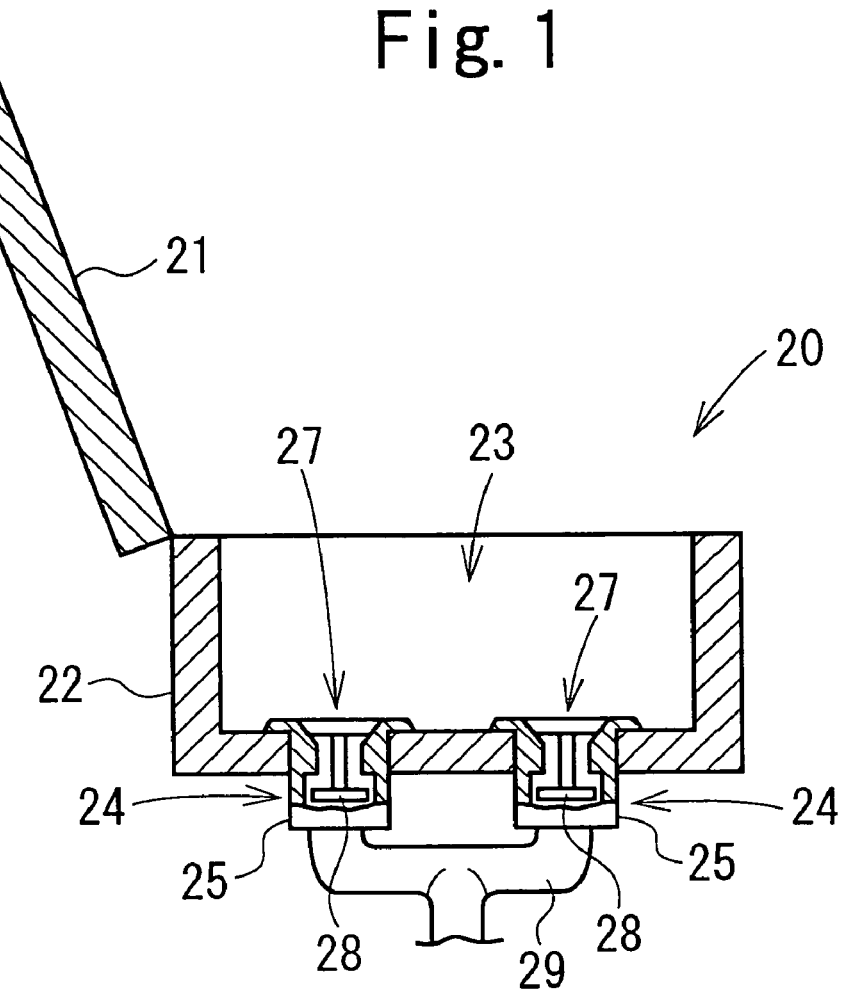
FIG. 1 is a sectional view of a mold, according to an embodiment of the present invention, in preparation for molding.

A mold according to the present invention requires no film or ejector pin; hence, the mold is useful in forming foam moldings having high surface accuracy with high yield.

A method of manufacturing a foam molding using the mold requires no step of bringing any film into contact with the internal face of a lower die after demolding; hence, the method has a short cycle time and high molding efficiency.

In the present invention, in the case where gas is supplied to a plurality of gas channels during demolding, even if one or more valve elements disposed in one or more of the gas channels protrude prior to other valve elements, gas flow-restricting units restrict the gas to flow into the one or more gas channels; hence, the gas is sufficiently supplied to the other gas channels and the other valve elements disposed in the other gas channels therefore protrude securely. Thus, a molding is uniformly pushed by the valve elements protruding from the gas flow-restricting units or the gas ejected therefrom. This enables smooth demolding.

The gas flow-restricting units may allow the gas to flow into the gas channels after the valve elements protrude, whereby the molding is pushed by the valve elements and the gas ejected from the gas channels in the demolding direction.

In order to allow the gas to flow into the gas channels after the valve elements protrude, the gas flow-restricting units may be connected to the valve elements and may include gas flow-restricting valves moving together with the valve elements. The gas flow-restricting valves may have openings or notches for allowing the gas to flow into the gas channels.

The gas flow-restricting units may be connected to the valve elements and may include gas flow-restricting valves moving together with the valve elements and valve seat sections on which the gas flow-restricting valves sit after the valve elements protrude. The valve seat sections may have recessed sections for allowing the gas to flow into the gas channels.

The gas flow-restricting units may prevent the gas from flowing into the gas channels after the valve elements protrude, whereby the molding pushed by the valve elements and thus removed from the mold.

The gas flow-restricting units may include gas flow-restricting valves moving together with the valve elements, whereby the gas flow-restricting units are allowed to spontaneously operate after the valve elements protrude.

In the mold, the valve elements may be substantially flushed with the internal face of the mold during molding, whereby the surface of the molding can be securely prevented from being bruised. The gas-blowing units may include urging members, such as springs, for urging the valve elements to move in a closing direction, whereby the efficiency of molding is further increased.

The mold may include valve boxes facing the cavity and the gas channels may be disposed in the valve boxes, whereby gas-blowing units can be readily attached to the mold or quickly replaced with other ones.

The gas channels may have end portions which are located close to the cavity and which are tapered such that the end portions spread toward the cavity and the external faces of the valve elements may be tapered and overlie the end portions of the gas channels. This allows the valve elements and the end portions thereof to have good sealing properties. The valve elements may have a taper angle larger than that of the end portions of the gas channels. This enhances the sealing properties.

The valve elements may be made of a readily releasable resin material or covered with the readily releasable resin material. This allows the valve elements to be readily separated from the molding. The valve boxes may be made of a readily releasable resin material or covered with the readily releasable resin material. This allows the valve boxes to be readily separated from the molding.

Figure 2:
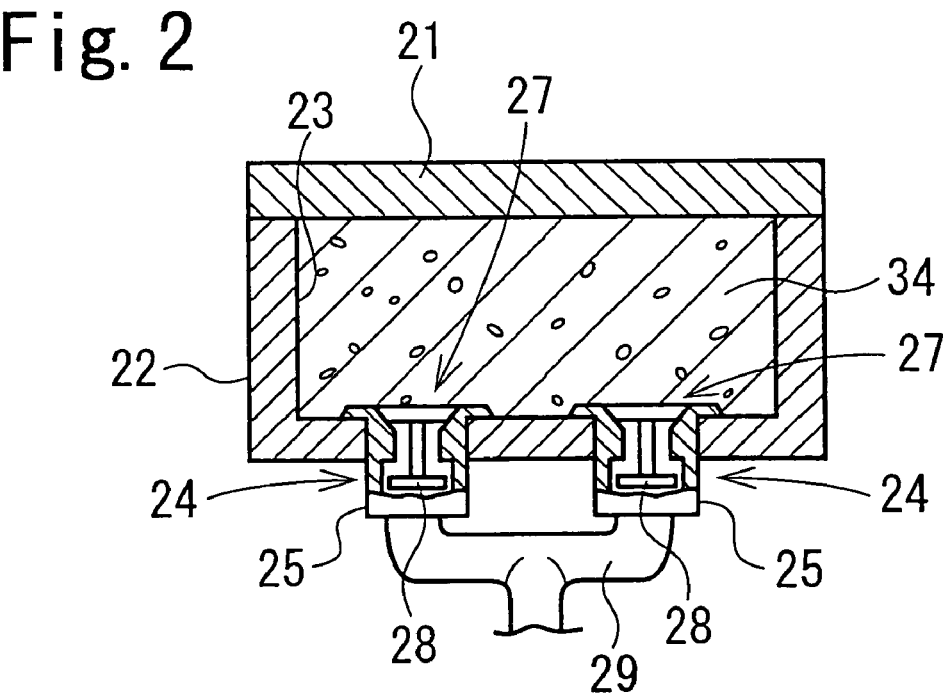
FIG. 2 is a sectional view of the mold, shown in FIG. 1, in operation for molding.
Figure 4A:
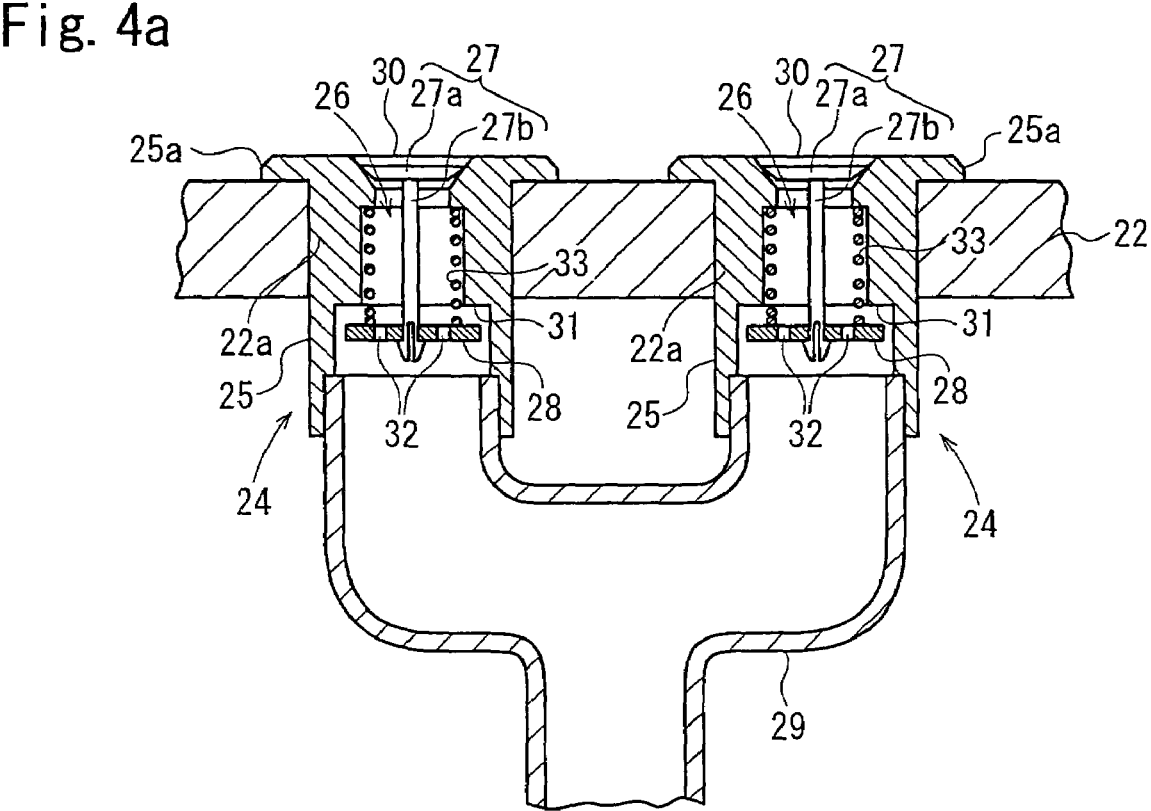
FIGS. 4a and 4b are sectional views showing configurations of gas-blowing devices.
Figure 4B:
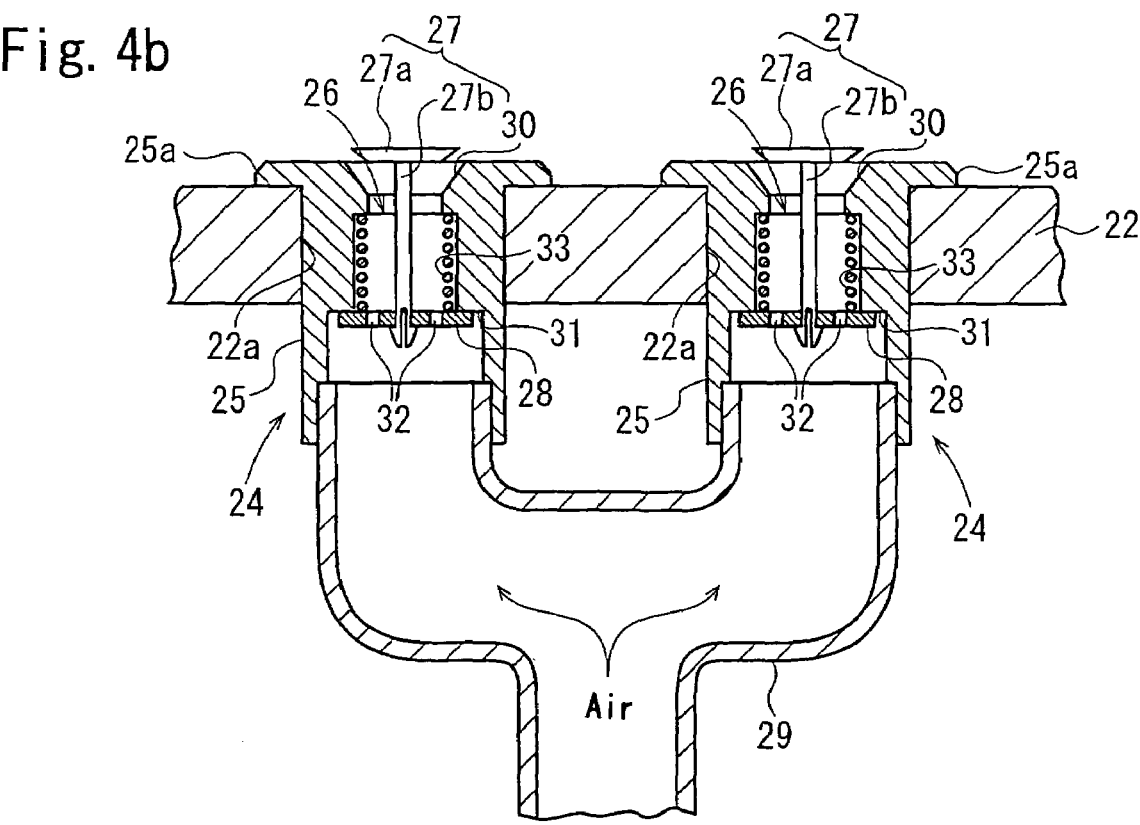
Figure 5A:
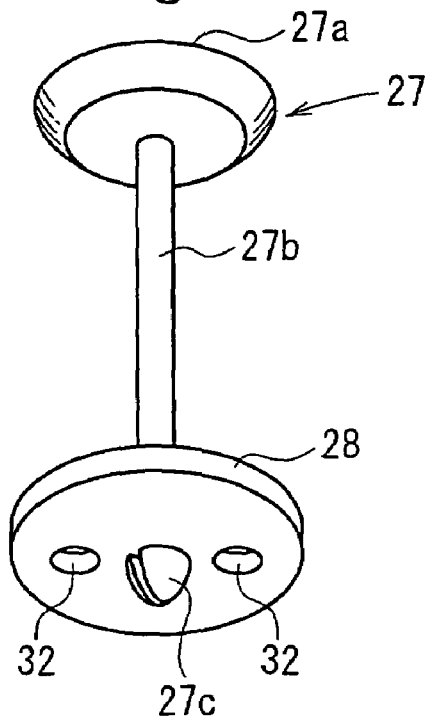
FIGS. 5a and 5b are illustrations showing a valve element and a gas flow-restricting valve.
Figure 5B:
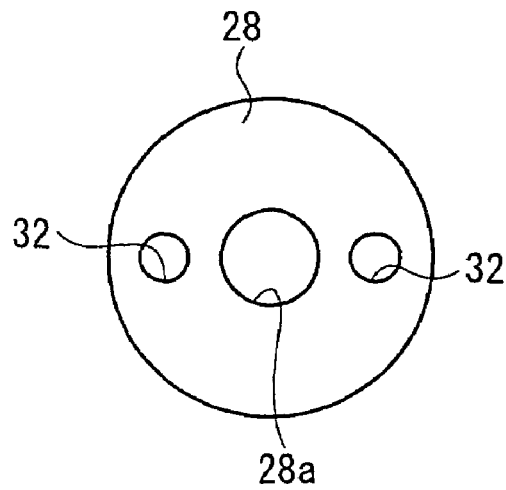
Figure 6:
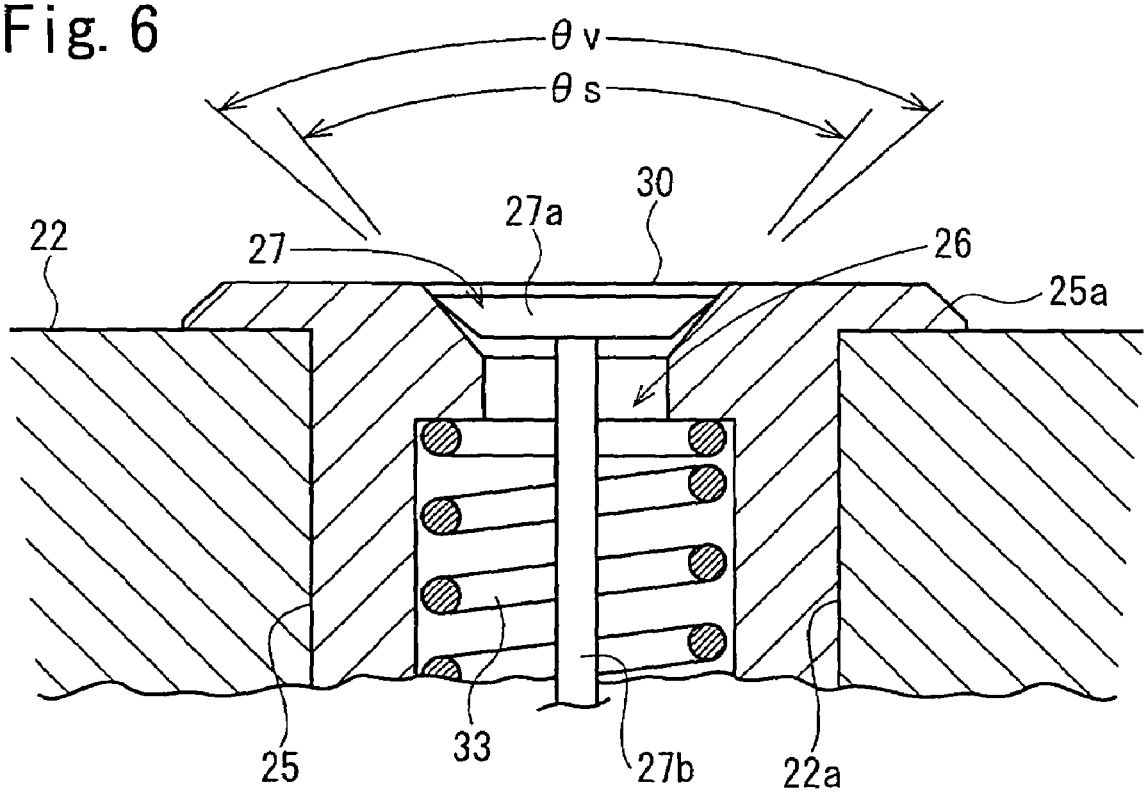
FIG. 6 is a sectional view of a valve seat section for a valve element.

Embodiments of the present invention will now be described with reference to the accompanying drawings. FIGS. 1, 2, and 3 are sectional views illustrating a mold, according to this embodiment, for foam molding and a foam molding procedure using the mold. FIGS. 4a and 4b are sectional views of gas-blowing devices: FIG. 4a shows the gas-blowing devices in preparation for demolding and FIG. 4b shows the gas-blowing devices in operation for demolding. FIG. 5a is a perspective view illustrating a valve element and a gas flow-restricting valve, FIG. 5b is a bottom view of the gas flow-restricting valve, and FIG. 6 is a sectional view of a valve seat section for the valve element.

A mold 20 includes an upper die 21 and a lower die 22. The lower die 22 has an open cavity 23 disposed in the upper face of the lower die 22. The cavity 23 is tapered such that the cavity 23 spreads upward at an appropriate angle. In this embodiment, the upper die 21 is driven with a driving device (not shown) such that the upper die 21 is rotatable with respect to the upper face of the lower die 22 in the direction in which the upper die 21 rises up or falls down. The present invention is not limited to this configuration.

A plural number (in this embodiment, two) of gas-blowing devices 24 are arranged in the bottom of the cavity 23. The gas-blowing devices 24 include valve boxes 25 attached to the bottom of the cavity 23; gas channels 26 arranged in the valve boxes 25; valve elements 27, vertically movable, disposed in the gas channels 26; gas flow-restricting valves 28 connected to lower end portions of the valve elements 27; an air pump (not shown), serving as a gas supply source, for supplying gas to the gas channels 26; and an intake duct (pipe) 29 for connecting the air pump to the gas channels 26. The intake duct 29 has a configuration in which a single pipe connected to the air pump is branched into a plural number (in this embodiment, two) of pipe portions connected to the gas channels 26 of the gas-blowing devices 24. Therefore, gas is supplied to the gas channels 26 of the gas-blowing devices 24 from the common air pump. In this embodiment, the gas supplied from the air pump supplies is, but not limited to, air (atmospheric air).

As shown in FIGS. 4a and 4b, the valve boxes 25 is cylindrically shape and have open upper and lower ends and the gas channels 26 are disposed in the valve boxes 25. The valve boxes 25 are fitted in openings 22a extending through a lower region of the lower die 22 and the upper end faces thereof are exposed at the bottom of the cavity 23. Flanges 25a spread radially from side faces of upper end portions of the valve boxes 25 and overlie the bottom of the cavity 23. The intake duct 29 is connected to lower portions of the valve boxes 25.

Open edges (internal edges of the upper ends of the valve boxes 25) of the gas channels 26 that are located close to the cavity 23 have valve seat sections 30 on which valve bodies 27a, described below, included in the valve elements 27 sit in the downward direction (in the direction from the cavity 23). The valve seat sections 30 have abutting faces which abut the valve bodies 27a and which are tapered such that the abutting faces spread toward the cavity 23, as shown in FIG. 6 in an enlarged manner.

As shown in FIGS. 4a and 4b, the gas channels 26 have internal regions each having an upper section, intermediate section, and lower section that have three different inner diameters. The upper section has the smallest inner diameter and the upper, intermediate, and lower sections are arranged in the increasing order of inner diameter. The intermediate section of each gas channel 26 has an inner diameter smaller than the outer diameter of the gas flow-restricting valves 28 and the lower section thereof has an inner diameter larger than the outer diameter of the gas flow-restricting valves 28. Each valve 28 is disposed in the lower section of the gas channel 28 such that the valve 28 can move vertically. The step between the intermediate and lower sections of the gas channel 26 corresponds to each valve seat section 31 on which the valve 28 sits in the upward direction (in the direction from the intake duct 29).

The intermediate section of the gas channel 26 contains each coil spring 33 that is compressed. An upper end portion of the coil spring 33 abuts the step between the intermediate and upper sections of the gas channel 26. A lower end portion of the coil spring 33 abuts the valve 28, whereby the valve 28 and each valve element 27 are pressed downward.

The valve elements 27 include the valve bodies 27a, sitting on the valve seat sections 30 in the downward direction, having substantially a disk shape and gas flow-restricting valve-connecting shafts (hereinafter simply referred to as connecting shafts) 27b, inserted in the gas channels 26 from the side close to the cavity 23, extending downward from center portions of the lower faces of the valve bodies 27a. Lower portions of the connecting shafts 27b are connected to the gas flow-restricting valves 28. The valve bodies 27a are connected to the valves 28 with the connecting shafts 27b; hence, the valve bodies 27a move vertically together with the valves 28.

As shown in FIG. 6, each valve body 27a has a tapered side face that overlies a tapered face of each valve seat section 30. The taper angle θv of the valve body 27a is larger than the taper angle θs of the valve seat section 30. Therefore, as shown in FIG. 6, when the valve body 27a is seated on the valve seat section 30, the upper edge of the side of the valve body 27a abuts the tapered face of each valve seat section 30.

Each gas flow-restricting valve 28 is substantially disk-shaped and has a diameter that is smaller than that of the lower section of each gas channel 26 but larger than that of the intermediate section thereof. As shown in FIG. 5b, the valve 28 has a connecting shaft-engaging hole 28a engaged with a lower section of each connecting shaft 27b. The lower section of the connecting shaft 27b has a snap-action engaging section 27c. In order to couple each connecting shaft 27b to the valve 28, the engaging section 27c is pressed into the engaging hole 28a, whereby the connecting shaft 27b is elastically engaged with the valve 28. The shaft 27b may be attached to the valve 28 with another technique such as nut fixing.

The gas flow-restricting valve 28 sits on the valve seat section 31 in the upward direction, as described above, to restrict gas to flow into the gas channel 26. The valve 28 has vent holes 32. After the valve 28 sits on the valve seat section 31, gas is allowed to flow into the gas channel 26 through the vent holes 32. As shown in FIG. 5b, the vent holes 32 are small-sized and circular. Two of the vent holes 32 and 32 are arranged in each valve 28. The shape, number, arrangement of the vent holes 32 are not limited to those described above.

When the valve body 27a is seated on the valve seat section 30, the upper face of the valve body 27a, the upper end face of the valve box 25, and the bottom of the cavity 23 are different in level from each other and are not flush with each other. The upper face of the valve body 27a, the upper end face of the valve box 25, and the bottom of the cavity 23 may be flush with each other.

The mold 20 is useful in forming a urethane foam which is a molding. The valve elements 27 and the valve boxes 25 facing the cavity 23 are made of polypropylene readily releasable from urethane. The valve boxes 25 and the valve elements 27 may be covered with a readily releasable material.

A procedure for forming a molding (urethane foam) using the mold 20 having the above configuration will now be described.

While the valve elements 27 are being closed as shown in FIGS. 1 and 4a, a releasing agent is applied onto the bottom of the cavity 23. In this operation, the valve bodies 27a are seated on the valve seat sections 30 and the gas flow-restricting valves 28 are located away from the valve seat sections 31. A urethane prepolymer solution is fed into the cavity 23, the upper die 21 is clamped, and the urethane prepolymer solution is then foamed as shown in FIG. 2.

After curing is finished, the upper die 21 is opened and air is supplied to the gas channels 26 of the gas-blowing devices 24 by operating the air pump.

Since air is supplied to the gas channels 26 from the air pump, the valve elements 27 move upward against the urging force of the coil spring 33 as shown in FIG. 4b, the valve bodies 27a protrude into the cavity 23, and the gas flow-restricting valves 28 sit on the valve seat sections 31. Air is continuously forced into the cavity 23 through the cavity 23.

The valve elements 27 extending into the cavity 23 and air forced into the cavity 23 through the cavity 23 press a molding 34; hence, the molding 34 is separated from the bottom of the cavity 23 and pushed upward. The molding 34 is then removed from the cavity 23.

After demolding, the supply of gas to the gas channels 26 of the gas-blowing devices 24 is stopped, so that the valve elements 27 move downward due to the urging force of the coil spring 33 and return to the state shown in FIGS. 1 and 4a. The next cycle is then started.

In the mold 20, if the valve element 27 disposed in one of the gas channels 26 protrudes prior to the valve element 27 disposed in the other one when gas is supplied to the gas channels 26 of the gas-blowing devices 24 from the air pump during demolding, the gas is restricted to flow into one of the gas channels 26 by one of the gas flow-restricting valves 28; hence, the gas is sufficiently supplied to the other one and thus the valve element 27 disposed in the other one securely protrudes into the cavity 23. This allows the molding 34 to be uniformly pressed by the valve elements 27 protruding from the gas channels 26 and the gas ejected therefrom; hence, demolding is smoothly performed.

The valves 28 move vertically together with the valve elements 27. Therefore, after the valve elements 27 protrude into the cavity 23, the valves 28 inevitably sit on the valve seat sections 31 disposed in the gas channels 26 to restrict the gas to flow into the gas channels 26.

In this embodiment, the valve seat sections 30 for the valve elements 27 are tapered such that the valve seat sections 30 spread toward the cavity 23 and the side faces of the valve bodies 27a of the valve elements 27, which sit on the valve seat sections 30, are also tapered. Furthermore, the taper angle θv of the valve bodies 27a is larger than the taper angle θs of the valve seat sections 30. Therefore, the edges of the valve bodies 27a are uniformly in contact with the valve seat sections 30 when the valve bodies 27a are seated on the valve seat sections 30. This provides extremely good sealing properties; hence, urethane contained in the molding 34 can be securely prevented from leaking between them.

Since the valve elements 27 and the valve boxes 25 are made of polypropylene readily releasable from urethane, the molding (polyurethane foam) 34 can be readily separated from the valve elements 27 and the valve boxes 25.

Since the valve boxes 25 having the gas channels 26 are attached to the lower die 22, the gas-blowing devices 24 can be readily provided in the bottom of the cavity 23 and replaced with other devices.

Figure 7A:
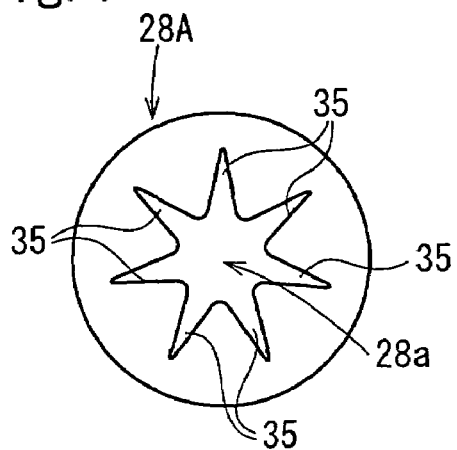
FIGS. 7a, 7b, 7c, 7d, and 7e are illustrations showing configurations of other gas flow-restricting valves.
Figure 7B:
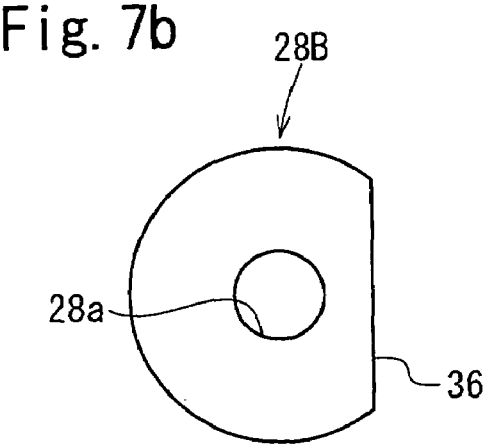
Figure 7C:
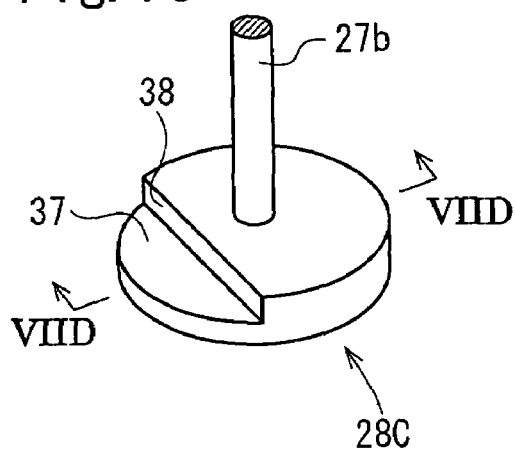
Figure 7D:
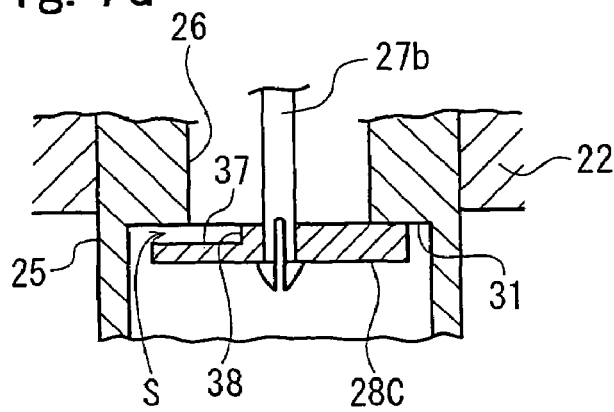
Figure 7E:
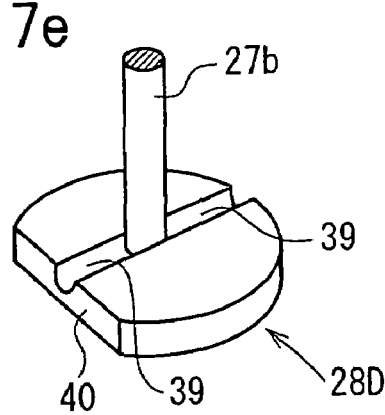

In this embodiment, in order to allow gas to flow into the gas channels 26 after the valves 28 sit on the valve seat sections 31, the valves 28 have the small, circular vent holes 32 and 32; however, the present invention is not limited to this configuration. Other types of gas flow-restricting valves 28A to 28D that allows gas to flow into gas channels after valves sit on valve seat sections will now be described with reference to FIGS. 7a to 7e. FIG. 7a is a top view of the valve 28A; FIG. 7b is a top view of the valve 28B; FIG. 7c is a perspective view of the valve 28C; FIG. 7d is a sectional view, taken along the line VIID-VIID of FIG. 7c, showing a situation in which the valve 28C is seated on a valve seat section 31; and FIG. 7e is a sectional view of the valve 28D. In FIGS. 7a to 7e, the same reference numerals as those shown in FIGS. 1 to 6 represent the same members as those shown in FIGS. 1 to 6.

The gas flow-restricting valve 28A shown in FIG. 7a has a connecting shaft-engaging hole 28a located at a center portion thereof and a plurality of notch-shaped slits 35 extending radially from the edge of the connecting shaft-engaging hole 28a. After the valve 28A moves in a gas channel 26 to sit on a valve seat section 31, gas is allowed to flow into a gas channel 26 through the slits 35.

The gas flow-restricting valve 28B shown in FIG. 7b has substantially a D-shape in which an end portion thereof is removed along a chord side 36. After this valve 28B moves in a gas channel 26 to sit on a valve seat section 31, a gap is present between the chord side 36 and an end portion of this valve seat section 31 and gas is allowed to flow into this gas channel 26 through the gap.

The gas flow-restricting valve 28C shown in FIGS. 7b and 7d has a recessed section 37 present in the upper face thereof. The recessed section 37 ranges from the side face of this valve 28C to a step, located close to the center of this valve 28C, extending in a chord direction. After this valve 28C moves in a gas channel 26 to sit on a valve seat section 31, a gap S is present between the recessed section 37 and an end portion of this valve seat section 31 and gas is allowed to flow into this gas channel 26 through this gap S.

The gas flow-restricting valve 28D shown in FIG. 7e has a groove 39 present in the upper face thereof. The groove 39 extends through the center of this valve 28D in the diameter direction of this valve 28D. Both ends of the groove 39 are exposed at the side face of this valve 28D. In this embodiment, in order to introduce gas into the groove 39, this valve 28D has a shape in which an end portion of this valve 28D is removed along a chord side 40. After this valve 28C moves in a gas channel 26 to sit on a valve seat section 31, gas is allowed to flow into this gas channel 26 through the groove 39.

Figure 8A:
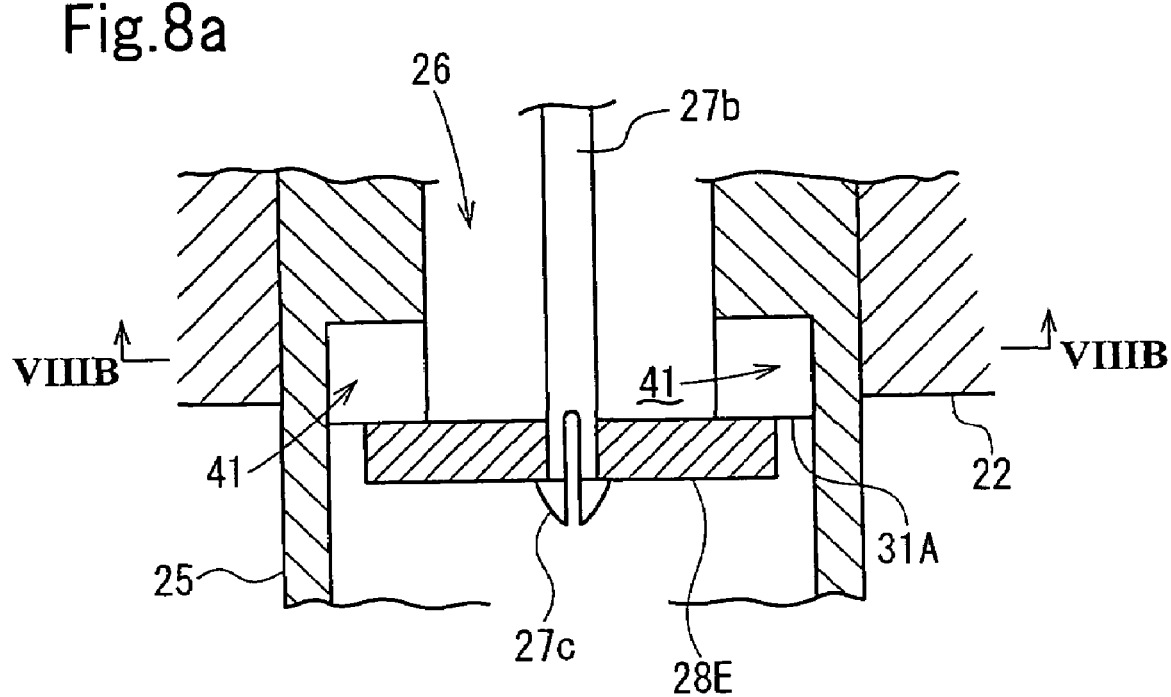
FIGS. 8a and 8b are illustrations showing a configuration of a valve seat section, having recessed sections, for a gas flow-restricting valve.
Figure 8B:
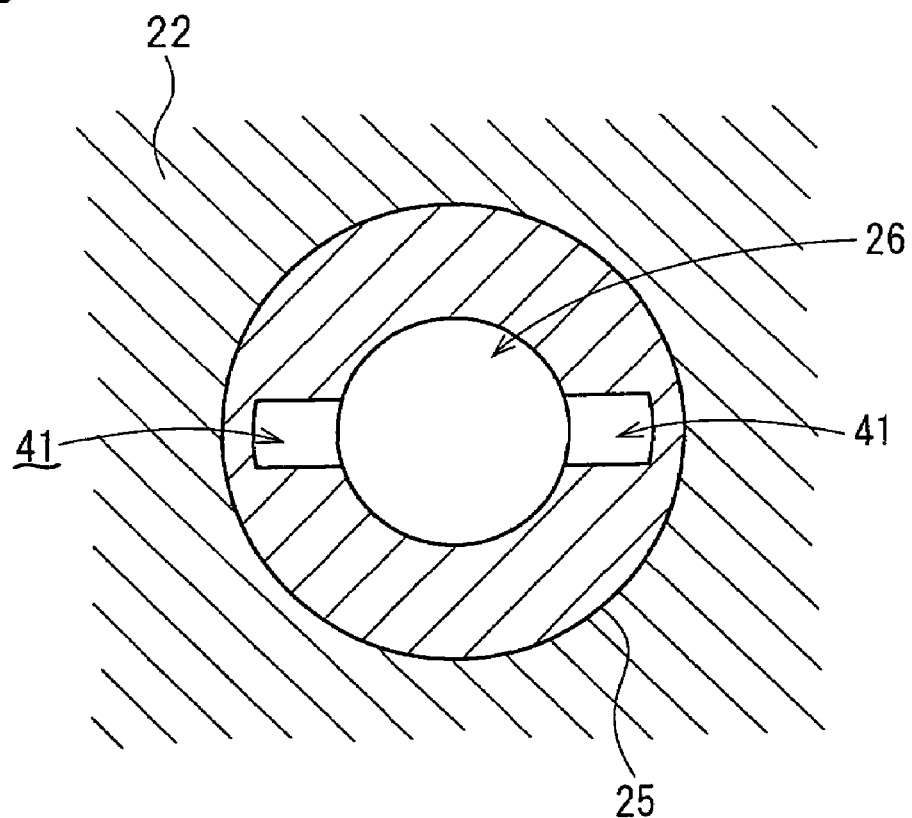
Figure 9A:
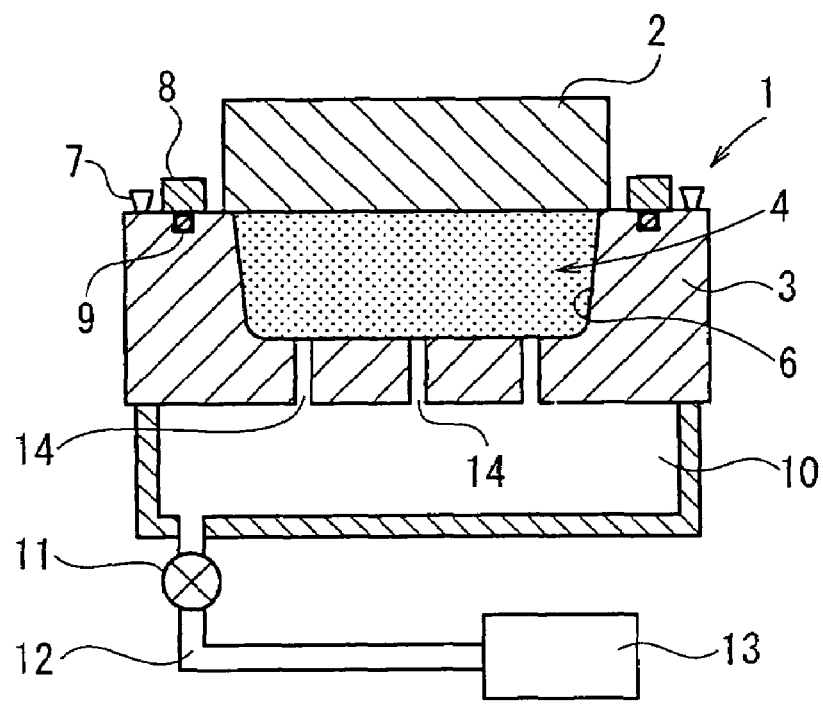
FIGS. 9A, 9B, and 9C are illustrations showing known examples.
Figure 9B:
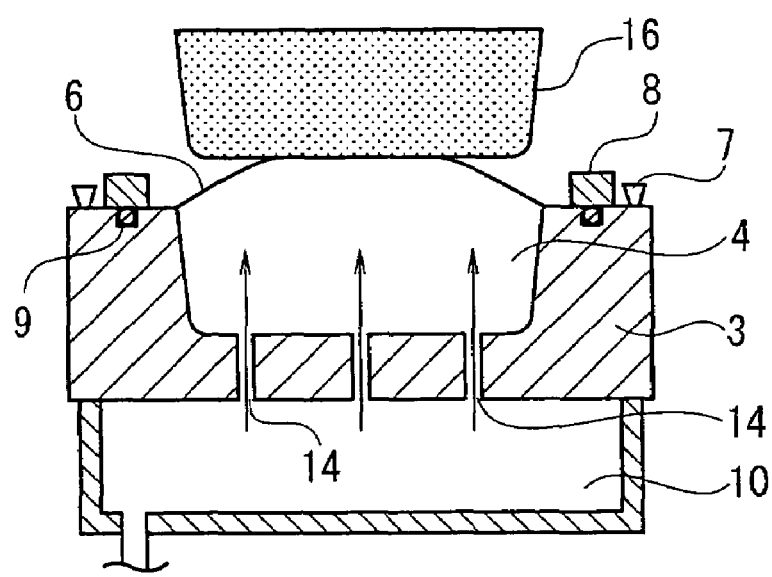
Figure 9C:
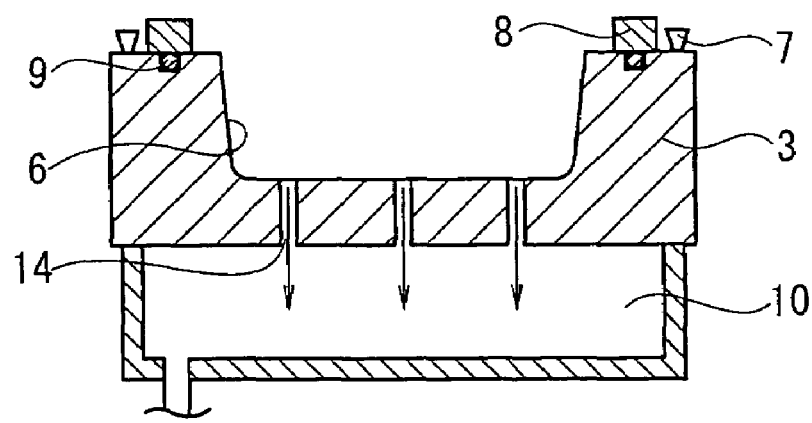

In the above embodiments, the gas flow-restricting valves have the vent holes, the recessed section, or another portion. Hence, after the gas flow-restricting valves 28 sit on the valve seat sections 31, gas is allowed to flows into the gas channels 26. A valve seat section may have a mechanism that allows gas to flow into a gas channel without allowing the gas flow-restricting valves to have the vent holes, the recessed section, or another portion. As shown in FIGS. 8a and 8b, FIG. 8a is a vertical sectional view of this valve seat section and FIG. 8b is a sectional view this valve seat section taken along the line VIIIB-VIIIB of FIG. 8a.

The gas flow-restricting valve 28 shown in FIGS. 8a and 8b has no vent hole or recessed section. In this embodiment, a valve seat section 31A on which this valve 28E sits has groove-shaped recessed sections 41, formed by partly removing end portions of this valve seat section 31A, extending vertically. In this embodiment, a pair of the recessed sections 41 and 41 are opposed to each other in the diameter direction. After this valve 28E sits on this valve seat section 31A, gas is allowed to flow into a gas channel 26 through the recessed sections 41.

In the above embodiment, gas is allowed to flow into this gas channel after this gas flow-restricting valve sits on this valve seat section. Alternatively, in the present invention, gas may be prevented from flowing into a gas channel after a gas flow-restricting valve sits on a valve seat section. In this configuration, a molding disposed in a cavity is pressed with a valve element, whereby this molding is removed from this cavity.

The above embodiments show examples of the present invention; hence, the present invention is not limited to the embodiments. For example, three or more of gas-blowing devices may be used. Furthermore, any gas other than air may be supplied to these gas-blowing devices.

In one of the above embodiments, the mold has the single cavity; however, the mold may have two or more cavities. In this configuration, the cavities may each have one or more gas-blowing devices to which gas is supplied from a common gas supply source.

In one of the above embodiments, as shown in FIG. 2, the flanges 25a of the valve boxes 25 are located above the bottom of the cavity 23; however, the flanges 25a of the valve boxes 25 may be flush with the bottom of the cavity 23.

In the present invention, one-touch couplers may be attached to the rear ends of the valve boxes such that hoses can be readily attached thereto.

The invention claimed is:

1. A mold for foam molding, comprising:
 a plurality of gas-blowing units for removing a molding from the mold by pneumatically pushing the molding and
 gas flow-restricting units,
 wherein the gas-blowing units include gas channels extending to the cavity and valve elements which block the gas channels during molding and which are moved into the cavity during demolding in such a manner that the valve elements are pneumatically pushed by gas supplied to the gas channels, the gas channels are supplied with gas from a common gas supply source, and the gas flow-restricting units allow the gas to flow into the gas channels after the valve elements block the gas channels and restrict the gas to flow into the gas channels after the valve elements protrude,
 wherein the gas flow-restricting units allow the flow of the gas to be continued although the gas flow-restricting units reduce the amount of the gas flowing into the gas channels after the valve elements protrude, and wherein the gas flow-restricting units are connected to the valve elements, include gas flow-restricting valves moving together with the valve elements and the gas flow-restricting valves have openings or notches for allowing the gas to flow into the gas channels.

2. The mold according to claim 1, wherein the gas flow-restricting units prevent the gas from flowing into the gas channels after the valve elements protrude.

3. The mold according to claim 1, wherein the gas flow-restricting units are connected to the valve elements and include the gas flow-restricting valves moving together with the valve elements and valve seat sections on which the gas flow-restricting valves sit after the valve elements protrude and the valve seat sections have recessed sections for allowing the gas to flow into the gas channels.

4. The mold according to claim 1, wherein the valve elements are substantially flushed with the internal face of the mold during molding.

5. The mold according to claim 1, wherein the gas-blowing units include urging members for urging the valve elements to move in a closing direction.

6. The mold according to claim 1, further comprising valve boxes facing the cavity, wherein the gas channels are disposed in the valve boxes.

7. The mold according to claim 1, wherein the gas channels have end portions which are located close to the cavity and which are tapered such that the end portions spread toward the cavity and the external faces of the valve elements are tapered and overlie the end portions of the gas channels.

8. The mold according to claim 7, wherein the valve elements have a taper angle larger than that of the end portions of the gas channels.

9. The mold according to claim 1, wherein the valve elements have surface sections made of a readily releasable resin material.

10. The mold according to claim 9, wherein the valve elements are made of the readily releasable resin material.

11. The mold according to claim 9, wherein the valve elements are covered with the readily releasable resin material.

12. The mold according to claim 1, wherein the valve boxes have surface sections made of a readily releasable resin material.

13. The mold according to claim 12, wherein the valve boxes are made of the readily releasable resin material.

14. The mold according to claim 12, wherein the valve boxes are covered with the readily releasable resin material.

15. The mold according to claim 9, wherein the mold is used to manufacture a urethane foam and the readily releasable resin material is polypropylene.

16. The mold according to claim 12, wherein the mold is used to manufacture a urethane foam and the readily releasable resin material is polypropylene.

* * * * *